United States Patent Office 2,890,682
Patented June 16, 1959

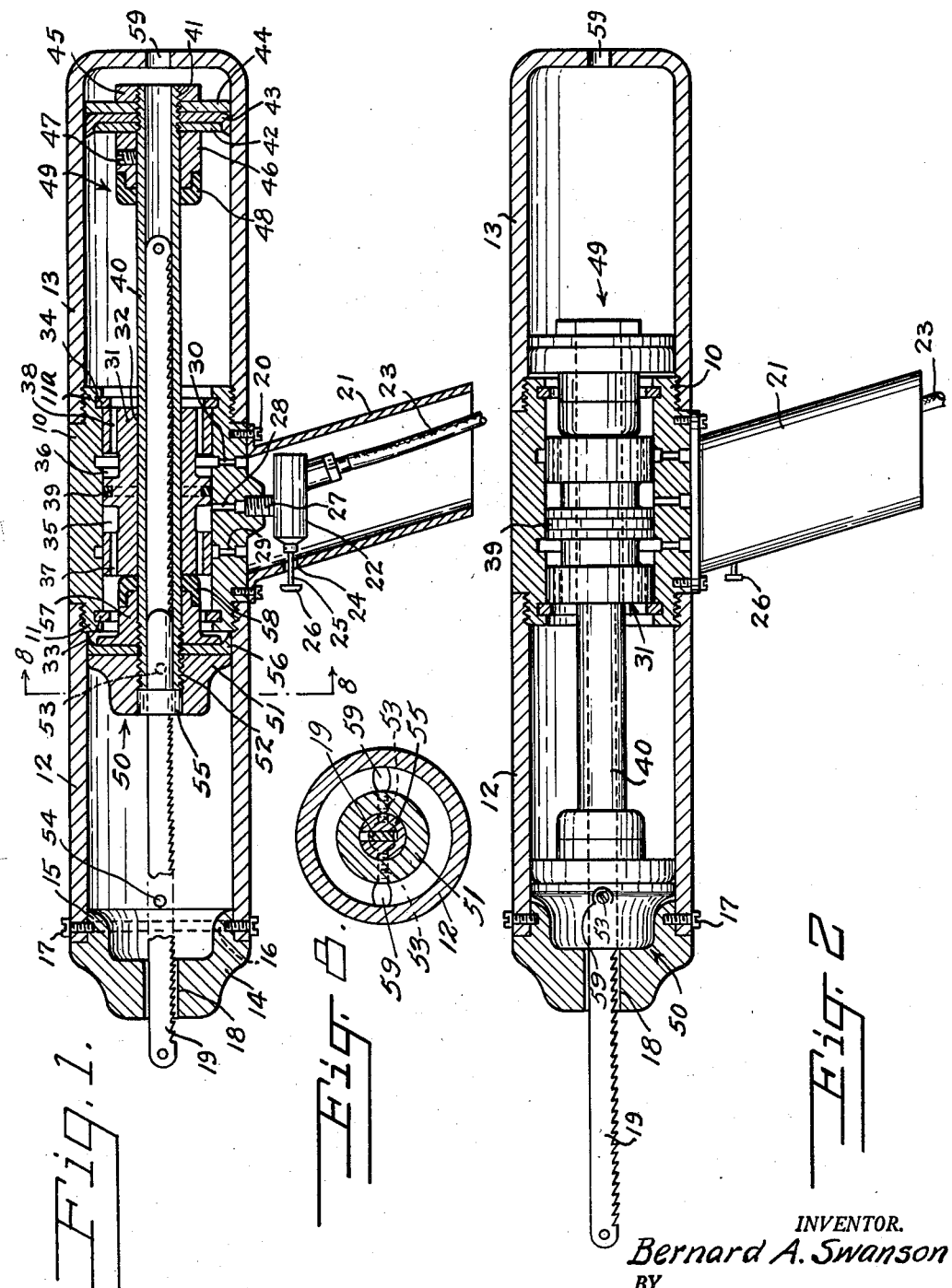

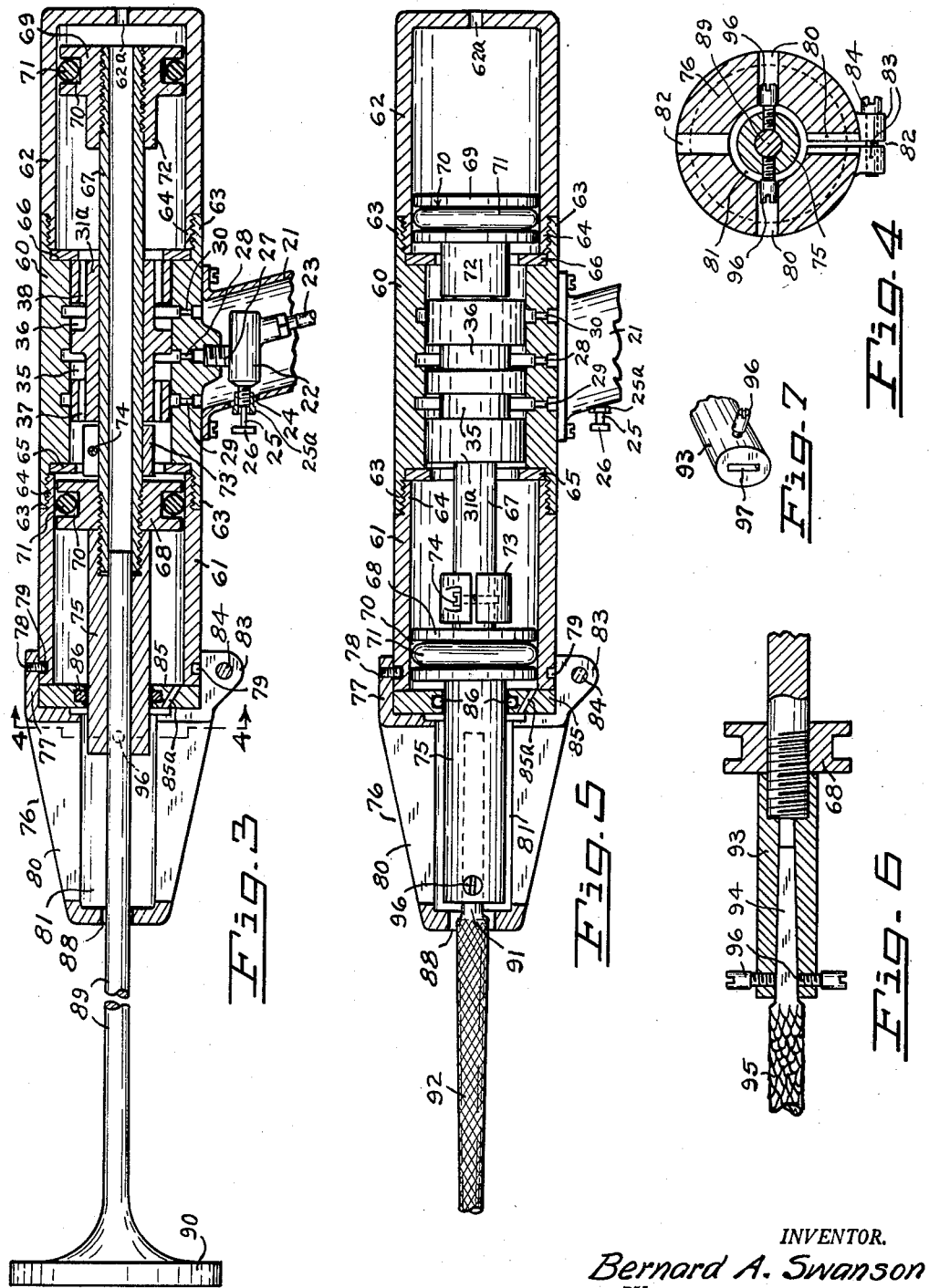

2,890,682

FLUID-UNDER-PRESSURE-OPERATED RECIPROCATING MECHANISM

Bernard A. Swanson, Seattle, Wash.

Application June 17, 1952, Serial No. 293,876

14 Claims. (Cl. 121—30)

My invention relates to the art of fluid-under-pressure operated reciprocating mechanism with a relatively long stroke.

More particularly, my invention relates to a fluid-under-pressure-operated reciprocating mechanism which imparts reciprocal motion to a tool connected thereto, the operation of which is normally characterized by requiring a long stroke.

For purposes of clearness and definiteness of illustration and disclosure, my invention will be particularly described as applied to the reciprocation of a tool in the form of a saw, although the application to other tools will be disclosed. By way of example and illustration, and not of limitation, the mechanism is also well adapted to be applied to a tamping tool for tamping the sand in a mold for making castings, or for tamping concrete, or like cases, where tamping is desirable. Also, as a further example, and by way of illustration and not limitation, the device is well adapted for use in connection with a tool in the form of a file or rasp. However, it is to be understood that my invention is not to be limited to any such specific disclosure of use but is applicable where the same problems are involved in whole or in part. The disclosure will be made in connection with air under pressure as the fluid-under-pressure means for operating the mechanism. However, water or oil under pressure, or steam, may be substituted for said pneumatic means.

This is a continuation in part of my co-pending application, Serial Number 97,662, filed June 7, 1949, for Pneumatic Saw, now abandoned.

Let it be particularly noted that one of the outstanding advantages of the mechanism herein disclosed is the exceedingly high degree of positive and definite control which the operator has over the device particularly when pneumatic pressure is employed. For example, in operating a tool of the character herein disclosed in connection with a highly refined product, it is of great importance that the tool be prevented from "jumping" out of the path in which it is operating on the product and thereby marring the adjoining area. The resiliency characterizing the operation of the device herein set forth renders it possible for the operator to control the device in a most positive manner and to operate with the utmost smoothness.

The primary object of the invention is to provide a device of the character described either readily portable or stationary, and one of exceptional efficiency in operation.

A further primary object of the invention is to provide a power operated saw which can be conveniently handled by the user in order to perform various sawing operations in places difficult to reach.

A further primary object is to provide a power operated saw with a selectively adjustable saw blade to cut or saw objects at various angles as may be required or desired, and may have its stroke adjustable as to length as may be desired.

A further primary object of the invention is to provide a pneumatic saw which may make use of broken parts of saws and which, in the preferred form, is so constructed that sawdust, emery dust and dirt or grit is positively prevented from reaching the inner reciprocating parts.

Also a primary object is to provide a power operated saw which is extremely simple and inexpensive to manufacture. Other objects and advantages will be apparent during the setting forth of the invention herein.

The above-mentioned general objects of my invention, together with others inherent in the same, are obtained by the mechanism illustrated in the following drawings, the same being preferred exemplary forms of embodiment of my invention, throughout which drawings like reference numerals indicate like parts:

Figure 1 is a longitudinal sectional view of a fluid-under-pressure-operated reciprocatory motor showing a tool in the form of a saw blade secured therein, the saw blade and parts being in retracted position;

Fig. 2 is a longitudinal sectional view of the same with parts in elevation and with parts including the saw blade in an extended position;

Fig. 3 is a longitudinal sectional view of a fluid-operated reciprocating motor of modified form showing the reciprocating parts at one end of their stroke and showing a tool in the form of a tamping bar connected therewith;

Fig. 4 is a view in cross section taken substantially on broken line 4—4 of Fig. 3;

Fig. 5 is a view partly in longitudinal section and partly in elevation of the motor shown in Fig. 4 with the reciprocating parts positioned at the other end of the stroke and showing a tool in the form of a rat-tail file connected therewith;

Fig. 6 is a detached view partly in section and partly in elevation showing a detachable part of the same motor secured to a tool carrier in the form of a solid rod, the tool secured being in the form of a wood rasp;

Fig. 7 is a view of a detachable part showing the rectangular slot for receiving the end of a tool in the form of a new blade, said slot serving as a holding means; and Fig. 8 is a transverse sectional partial view taken substantially along broken line 8—8 of Figure 1.

Referring in detail to the drawings, the numeral 10 designates an open ended hollow valve housing which is provided with an external threaded forward shoulder 11 and a rear shoulder 11a on the end thereof. A pair of open ended tubular sleeves (forward sleeve) 12 and (rear sleeve) 13 are arranged in threaded engagement with said shoulders. A selectively adjustable head 14 is mounted on the front end portion of the sleeve 12. The said head 14 is provided with a projecting portion 15 which has an annular groove 16 formed therein, and a plurality of set screws 17 project through the sleeve 12 and into the groove 16 for moving the said head 14 into adjusted position and also for holding it immobile in said adjusted position. The head 14 also has a slot 18 arranged axially therein for the slidable projection therethrough of the saw blade 19. Depending supported by the housing 10 and secured thereto by securing arrangements such as headed bolts 20, is a hollow handle 21. Arranged in the handle 21 is an air control valve 22 which is adapted to be connected to a source of fluid such as compressed air by a flexible hose 23. The valve 22 functions to control the flow of fluid from the source of supply and the valve is actuable externally of the handle. Thus the handle 21 is provided with an aperture 24 through which projects a valve stem 25 and a valve actuating button 26 is secured to the outer end of the stem 25. An adjustable stop nut 25a (Fig. 5) encircling the stem 25 and threadedly mounted on valve 22 functions to control the amount of air entering valve 22, thereby controlling the power and speed of the tool. The incoming compressed air passes from the valve 22 through a fitting 27 and then through a registering port 28 which is formed in the housing 10. The housing 10 is also provided with a pair of spaced openings 29 and 30 for the discharge or exhaust therethrough of the fluid as subsequently described, said openings being disposed one on each side of the longitudinal middle of the housing 10 and spaced equally on each side of said middle.

Slidably arranged in the housing 10 is a valve member 31 of cylindrical form having on each side of its longitudinal center a circumferential transverse annular groove; namely 35 and 36, and having a bore 32 longitudinally extending therethrough. This type of valve member is commonly called by those skilled in the art the "hill and valley type" and as it has the tool carrier member slidably mounted in the axially disposed bore 32, it is referred to as a "sleeve valve." A pair of spaced stop rings 33 and 34 disposed in parallel planes, are fixedly seated in the housing 10 for limiting sliding movement of said sleeve valve member 31. The said sleeve valve member 31, in addition to the pair of spaced annular transverse grooves 35 and 36, has also a first plurality of longitudinally disposed passageways 37 extend from the groove 35 to the adjacent end of the sleeve valve member 31 while a second set or group of longitudinally disposed passageways 38 extend from the groove 36 to the other end of said sleeve valve member 31. A suitable ring 39 which may be made of rubber or like material is arranged on the said sleeve valve member 31 intermediate its ends for insuring a fluid tight fit between the sleeve valve member 31 and the housing 10.

Slidably arranged in the bore 32 of said sleeve valve member 31 is a reciprocating tool carrier member 40 which may be either of tubular form, as shown in Figs. 1, 2, 3, 4 and 5, or of solid form, as shown in Fig. 6. In Figs. 1 and 2, the reciprocating tool carrier member 40 carries the saw blade 19 being held by means of set screws 53. By having the carrier member 40 of tubular form, the length of the saw blade 19 held therein may be varied. In case of an accident whereby the blade is broken, the blade may be extended and the required amount of blade be available for use. In this manner, the device is adapted to employ broken band saws which are normally discarded.

A means is provided on each end of the reciprocating tool carrier member causing shifting movement of the sleeve valve member 31. Thus, the rear end of the tool carrier member 40 is threaded exteriorly for a portion of its length as at 41, such threading 41 extending along the length of said tool carrier member 40 to permit adjustment of the length of stroke of piston assemblies 49 and 50 and tool carrier member 40, as desired. Arranged in threaded engagement with the rear end of the tool carrier member 40 is a first nut 42, a leather washer 43, a second nut 44 and finally a lock nut 45, Figure 1. Circumposed on the tool carrier member 40 and arranged contiguous to the nut 42 is a block 46 which is maintained immobile on the tool carrier member 40 by means of a set screw 47. A rubber cap 48 is carried by the block 46. The elements 42 through 48 coact to define a piston head 49 for a purpose to be later described.

Arranged on the forward end of the tool carrier member 40 is a second piston head assembly 50 which comprises a block 51 that is threaded on to the front end of the tool carrier member 40 as at 52. A suitable securing element, such as a screw 53, maintains the block 51 on the front end of the tool carrier member 40, there being a pair of opposed openings 54 in the sleeve 12 whereby a tool, such as an Allen wrench, can be inserted through the openings 54 for removing or applying screws 53 as desired. As shown in Figs. 1 and 8, a split plug 55 is applied in one end of the block 51 for holding the saw blade 19 securely mounted in position during the use thereof. Two screws 53 hold the sides of split plug 55 tight against the blade 19 in mounting the same on the tool carrier member 40, block 51 being suitably recessed as indicated at 59 to accommodate said screws 53. Threaded on the front end of the tool carrier member 40 and positioned contiguous to the block 51 is a leather cup 56 and arranged adjacent to the leather cup 56 is a body member 57 having a rubber cap 58 thereon.

In operation, air or other fluid under pressure is conveyed by the flexible hose 23 from a suitable source of supply to the valve 22 which is arranged in the handle 21. The valve 22 is manually controlled whereby the flow of fluid therethrough can be controlled and the compressed air leaves the valve 22, passes through a fitting 27 then through the port 28 and into the interior of the valve housing 10. Thus, with the saw blade 19 in its retracted position, as shown in Figure 1, the incoming air is directed through the groove 35, then through the passageways 37, and this air is emitted against the leather cup 56 to thereby cause the reciprocating tool carrier member 40 to move forwardly. As the tool carrier member 40, carrying the saw blade 19, moves forwardly, air will be forced out through the openings 54 in the forward end of the sleeve 12. At the same time, air in the sleeve 13 will be forced by the tool carrier member 40 through the passageways 38 in the hill and valley sleeve valve member 31 through the opening 30 in the housing head, and finally this air will exhaust through the hollow handle 21. When the tool carrier member 40 moves to its extreme forward position, as shown in Fig. 2, the sleeve valve member 31 will be shifted so that the incoming air will now pass through the groove 36 through the passageways 38 to thereby move the piston head 49 to the rear of the sleeve 13. As the piston head 49 moves to the rear, air will be forced through the opening 59 in the rear end of the sleeve 13. At the same time, the piston head 50 will cause or force air to exhaust or discharge through the passageways 37 through the opening 29 and finally through the handle 21. This cycle is, of course, repeated continuously as long as the operator actuates the valve 22 so that the saw blade 19 is reciprocated back and forth whereby an object can be readily cut as desired. The various parts of the piston head 49 can be adjusted longitudinally along the tool carrier member 40 by changing the position of piston 49 therealong by means of threads 41 and cooperating elements 42 through 48, so that the length of stroke of the tool carrier member 40 can be adjusted as desired. Further, the head 14 can be rotated about the sleeve 12, whereby the sawing operations can be performed at various angles and thus sawing operations may be carried on in recesses difficult of access with the saw blade radially adjusted with respect to the longitudinal axis of the blade.

The fluid pressure operated reciprocatory motor shown in Figs. 3, 4, 5, 6 and 7, which represent the preferred form or forms of my invention, has a housing made up of three tubular parts: the housing 60, the forward sleeve 61, and the rear sleeve 62, which correspond in a general way to the previously described parts 10, 12 and 13—said tubular part 62 having exhaust or breather port 62a. Likewise, end plate or washer dust excluder 85 has opening 85a as an exhaust or breather port. The medail tubular housing member 60 has two end portions 63 which are counterbored and are internally threaded to receive externally threaded end portions 64 of reduced diameter of the housing parts 61 and 62. Two stop washers 65 and 66 have their marginal portions securely clamped between the adjoining end portions of the housing parts 60, 61 and 62.

The handle 21 and the supply and control means 22, 23, 24, 25, 26 and 27 for fluid under pressure are the same in Figs. 3, 4 and 5 as they are in Figs. 1 and 2, and are similarly numbered.

A hill and valley sleeve valve 31a in Figs. 3 and 5 is similar to the hill and valley sleeve valve member 31 of Figs. 1 and 2 except that the stop rings 11a of housing 10 are omitted and washers 65 and 66 substituted therefor. Said washers are held in place in a recess formed between the end of sleeve 61 and shoulder of 60 and between the end of sleeve 62 and a shoulder of 60. This greatly facilitates manufacture, assembly and repair. Said sleeve valve 31a and the housing part 60 within which it operates have fluid passageways, ports and annular grooves 28, 29, 30, 35, 36, 37 and 38 which are similar to those shown in Figs. 1 and 2 and which are similarly numbered and function in the same manner as are previously herein described.

A reciprocating tool carrier member 67 is slidably disposed within a suitable axial bore in the sleeve valve member 31a. The tool carrier member 67 may be tubular, as shown, to receive therein a tool or the shank of a tool. Obviously, if it is not necessary to extend a tool or tool shank into this member 67 then said member 67 may be a solid rod (Fig. 6). Both ends of the reciprocable member 67 are externally threaded to receive thereon two internally threaded pistons 68 and 69. Each piston 68 and 69 has an annular groove 70 wherein is disposed a resilient ring 71, of a type commonly known as an O-ring, which functions as a fluid tight sealing ring between the piston and the cylinder in which it reciprocates. The piston 69 has a hub 72 on the side thereof adjacent the sleeve valve member 31a. The hub 72 is adapted to contact the sleeve valve member 31a and move said member from the position shown in Fig. 3 to the position shown in Fig. 5. A split collar 73 is mounted for longitudinal adjustment on the reciprocable tool carrier member 67 adjacent the other piston 68 to move the sleeve valve member 31a in the reverse direction from the position shown in Fig. 5 to the position shown in Fig. 3. A screw 74 is used to clamp the split collar 73 in a desired adjusted position on the reciprocable member 67. Longitudinal movement of the sleeve valve member by either the hub 72 or the split collar 73 will reverse the connection of the cylinders 61 and 62 as respect inlet and exhaust of fluid under pressure and thus continuous reciprocation of the tool carrier member 67 and parts connected therewith is provided.

The threaded end portion of the reciprocable tool carrier member 67, which is shown at the left in Fig. 3, extends through and beyond the piston 68 and has an end portion of a tool adapter member 75 threaded thereover. The tool adapter member 75 is jammed against the piston 68 like a lock nut and prevents relative loosening of the tool adapter 75 and piston 68 on the reciprocable member 67.

A combined guide and hand-hold member or head 76 of externally tapered shape has a cup-shaped larger end part 77 which fits over and is rotatively attached to the forward end portions of the tubular housing member 61. One or more screws 78 are threaded through the cup-shaped end part 77 and extend into an annular groove 79 (Fig. 3) in the housing member 61 and prevent longitudinal displacement of the members 76 and 61. The member 76 has a plurality of longitudinally and radially extending slots 80 and has an axial passageway 81 in which the adapter 75 reciprocates. The cup-shaped end part 77 has a radial split 82 (Fig. 4) on one side and is provided on opposite sides of the split 82 with lugs 83 to receive a screw 84 by which the said end portion 77 may be tightened on the forward sleeve 61 to prevent lost motion and vibration of the member 67 and to regulate frictional grip of the end portion 77 on the housing part 61. A washer-shaped dust excluder end plate 85 is interposed between the bottom of the cup-shaped end part 77 and the end of the housing part 61. The end plate, or washer dust excluder 85, serves as a guide for the adapter member 75 and may have a packing or O-ring 86 therein to exclude dirt, tool cuttings and the like from housing 61. The axial passageway 81 in the guide member 76 receives the adapter member 75 and an opening 88, which may be varied in size and shape depending on the tool to be used, is provided in the outer end of the guide member 76—said opening may be round to receive tamper stem 89 or rectangular as shown at 97 (Fig. 7) to receive a saw blade 19 (Fig. 1) held in place by set screw 96.

The adapter member 75 is designed to receive and hold a tool or other device which is to be reciprocated, such as the saw 19 shown in Figs. 1 and 2, or the stem 89 of tamper 90 shown in Fig. 3, or the shank 91 of a rat-tail file 92, shown in Fig. 5. The tamper 89, 90 may be of a type commonly used to tamp sand in molds used in casting or it may be of larger size for concrete or other work.

Also, the internal shape of a tubular adapter member 93 (Fig. 6), similar to the adapter member 75, may be varied to receive a tapered shank 94 of square or rectangular cross section on a tool, such as a wood rasp 95.

The tool, or tool shank, or like part, which is inserted in the adapter 75 or 93 is securely held by one or more set screws 96. The heads of the set screws 96 are guided in the slots 80 of member 76 and the tool can be turned and guided in the work by turning the guide member 76, thereby facilitating operation of the tool especially in the case of a saw in reaching parts difficult of access. Also, the heads of the set screws 96 are readily accessible through the slots 80 for change or adjustment of the tools.

While various changes may be made in the detail construction, it shall be understood that such changes shall be within the spirit and scope of the present invention as defined by the appended claims.

I claim:

1. A fluid-under-pressure reciprocated tool operating mechanism, comprising a hollow open-ended housing; a sleeve projecting from one end of said housing and a sleeve projecting from the other end of said housing, said sleeves being supported by said housing; a handle secured to said housing; a reciprocatory valve member axially and rotatably disposed in said housing, said valve member having a circumferential transverse annular groove on each side of a plane transverse to its longitudinal center and a longitudinal passageway leading from each said groove to the adjacent end of said valve members; a bore extending axially and longitudinally through said valve member; conduits operatively connecting said valve member to a source of fluid under pressure; a reciprocatory hollow tool carrier member guidingly and rotatably disposed in said valve member bore; and a piston slidably disposed in each said sleeve and mounted on each end portion of said tool carrier member.

2. A fluid-under-pressure reciprocated tool operating mechanism, comprising a hollow open-ended housing; a forward sleeve projecting from one end of said housing and a rear sleeve projecting from the other end of said housing, said sleeves being supported by said housing; a handle secured to said housing; a reciprocatory valve member axially and rotatably disposed in said housing, said valve member having a circumferential transverse annular groove on each side of a plane transverse to its longitudinal center and a longitudinal passageway leading from each said groove to the adjacent end of said valve member; a bore extending axially and longitudinally through said valve member; conduits operatively connecting said valve member to a source of fluid under pressure; a reciprocatory hollow tool carrier member guidingly and rotatably disposed in said valve member bore; a piston slidably disposed in each said sleeve and mounted on each end portion of said tool carrier member; and a reciprocatory tool having a portion thereof retained an adjustable extent within said hollow tool carrier member.

3. Mechanism according to claim 2, further comprising a tool clamping member secured adjacent the forward end portion of said tool carrier member.

4. Mechanism according to claim 3, wherein said tool is a saw blade.

5. Mechanism according to claim 4, wherein said tool clamping member secured to the forward end portion of said tool carrier member comprises a split plug arranged to securely and releasably retain said saw blade therein.

6. Mechanism according to claim 3, wherein said tool is a tamper.

7. Mechanism according to claim 3, wherein said tool is a file.

8. Mechanism according to claim 2, further comprising an adjustable stroke-limiting stop mounted on said reciprocatory tool carrier member for providing an adjusting means for regulating the length of stroke of said piston and said tool carrier member.

9. Mechanism according to claim 2, further comprising a manually operable valve disposed in said handle controlling the flow of fluid under pressure delivered through said valve member, said manually operable valve having a stem and an adjustable stop lock nut encircling said stem of said valve and threadedly mounted on said valve in providing selective manual control of the amount of fluid under pressure delivered through said valve member and thereby the reciprocatory power and speed of the mechanism.

10. Mechanism according to claim 2, further comprising a head mounted on the outer end portion of said forward sleeve adapted to be maintained in pressure engagement with an article being worked on, said head having an opening registrable with said tool.

11. Mechanism according to claim 2, further comprising a head rotatably and adjustably mounted on the outer end portion of said forward sleeve and adapted to be maintained in pressure engagement with an article being worked on, said head having an axial tool opening of a contour accommodating the cross-sectional contour of the tool to be reciprocated therethrough, said opening being registrable with said tool, said pistons, said head, and said tool carrier member mounting the tool being rotatively adjustable with respect to the longitudinal axis of said sleeve.

12. Mechanism according to claim 11, wherein said tool is a saw blade.

13. Mechanism according to claim 2, wherein said housing, said valve member, said valve member core, said tool carrier member, and said tool portion adjustably arranged in said tool carrier member are concentrically arranged.

14. Mechanism according to claim 2, wherein said valve member bore is cylindrical, and said hollow tool carrier member is tubular in construction.

References Cited in the file of this patent

UNITED STATES PATENTS

| | | |
|---|---|---|
| 996,722 | Keltner | July 4, 1911 |
| 1,001,821 | Coffield | Aug. 29, 1911 |
| 1,347,444 | Christiansen | July 20, 1920 |
| 1,441,017 | Mattson et al. | Jan. 2, 1923 |
| 2,246,535 | Playfair | June 24, 1941 |
| 2,555,018 | Von Seggern | May 29, 1951 |

FOREIGN PATENTS

| | | |
|---|---|---|
| 883,785 | France | Apr. 5, 1943 |